US006931750B1

(12) United States Patent
Lee

(10) Patent No.: US 6,931,750 B1
(45) Date of Patent: Aug. 23, 2005

(54) TEMPLATE FOR MAKING DECORATIVE HOLES IN A PIECE OF PAPER PLACED ON TOP OF THE TEMPLATE

(76) Inventor: Chung-Heng Lee, No. 76, Pao-Kao Rd., Hsintien City, Taipei Hsien (TW)

(*) Notice: Subject to any disclaimer, the term of this patent is extended or adjusted under 35 U.S.C. 154(b) by 0 days.

(21) Appl. No.: 10/870,975

(22) Filed: Jun. 21, 2004

(51) Int. Cl.[7] ........................... B43L 13/00; B43L 9/00; G01B 3/14
(52) U.S. Cl. ........................ 33/563; 33/613; 33/DIG. 1
(58) Field of Search ............................ 33/27.03, 27.07, 33/562, 563, 566, 574, 577, 613, 645, DIG. 1

(56) References Cited

U.S. PATENT DOCUMENTS

| | | | | |
|---|---|---|---|---|
| 3,128,555 | A * | 4/1964 | Jackson | 33/27.03 |
| 3,138,874 | A * | 6/1964 | Cooper | 33/565 |
| 4,594,792 | A * | 6/1986 | Cramb | 33/562 |
| 4,934,061 | A * | 6/1990 | Knight et al. | 33/DIG. 1 |
| 5,012,586 | A * | 5/1991 | Ashworth | 33/DIG. 1 |
| 5,183,373 | A * | 2/1993 | Floyd, Jr. | 33/27.03 |
| 5,615,485 | A * | 4/1997 | Stoneberg | 33/27.03 |
| 5,987,760 | A * | 11/1999 | Hsu | 33/27.03 |
| 6,112,425 | A * | 9/2000 | Nelson et al. | 33/566 |
| 6,189,226 | B1 * | 2/2001 | Mascarenas | 33/563 |
| 6,223,443 | B1 * | 5/2001 | Jacobs | 33/27.03 |
| 6,862,816 | B1 * | 3/2005 | Romer | 33/563 |
| 2003/0070313 | A1 * | 4/2003 | Romer | 33/566 |

* cited by examiner

*Primary Examiner*—G. Bradley Bennett
(74) *Attorney, Agent, or Firm*—Rosenberg, Klein & Lee

(57) ABSTRACT

A template includes a mouth defined in a side face of the template for receiving therein an auxiliary tool. A combining device is formed on a periphery defining the mouth for combination with the auxiliary tool and patterns are defined through a periphery of the template. Positioning holes are defined through the periphery of the template to receive therein a pair of magnets. The piece of paper is able to be positioned on top of the template by the two magnets one of which is received in a corresponding one of the positioning holes and the other one of which is on top of the piece of paper to attract the other magnet.

2 Claims, 3 Drawing Sheets

TEMPLATE FOR MAKING DECORATIVE HOLES IN A PIECE OF PAPER PLACED ON TOP OF THE TEMPLATE

BACKGROUND OF THE INVENTION

1. Field of the Invention

The present invention relates to a template, and more particularly to the template for making decorative holes in a piece of paper which is placed on top of the template.

2. Description of Related Art

People, especially school children, are often asked by the teachers to make their own cards for special occasions, e.g. Mothers' day, Fathers' Day etc. Simple tools such as scissors, paper clips and so on are used to make patterns on the cards with the hopes that the cards will be unique and the maker will receive the appreciation from the recipients. However, when making the patterns, because there is no auxiliary tool to position the card, the patterns may not be the shape as originally designed. In fact, as young children may not be able to accurately plan the development of the cards, the results may be total chaos. Even so, in order to encourage the creativity of the children, the adult recipients still manage to show their appreciation.

When the pattern is a linearly formed shape, the outcome of the card may not be so ruined. However, if the pattern is formed as an arcuate shape, due to the lack of any positioning device, the pattern is not able to show the original design and becomes unrecognizable. Therefore, if a child works very hard to make a special card for someone and expects to receive appreciation, but because of the chaos of the pattern resulting from the lack of any suitable positioning device, what the child may possibly experience is the anxiety from the recipients trying very hard to figure out what the cards are trying to express.

To overcome the shortcomings, the present invention tends to provide an improved greetings card template to mitigate the aforementioned problems.

SUMMARY OF THE INVENTION

The primary objective of the present invention is to provide an improved greetings card template having a positioning function to facilitate the formation of well arranged decorative holes in a piece of paper placed on top of the template Another objective of the present invention is that the template has a pair of magnets respectively attached to each other with the template sandwiched therebetween such that the piece of paper on top of the template is positioned.

Other objects, advantages and novel features of the invention will become more apparent from the following detailed description when taken in conjunction with the accompanying drawings.

DETAILED DESCRIPTION OF THE PREFERRED EMBODIMENT

Figure 1:
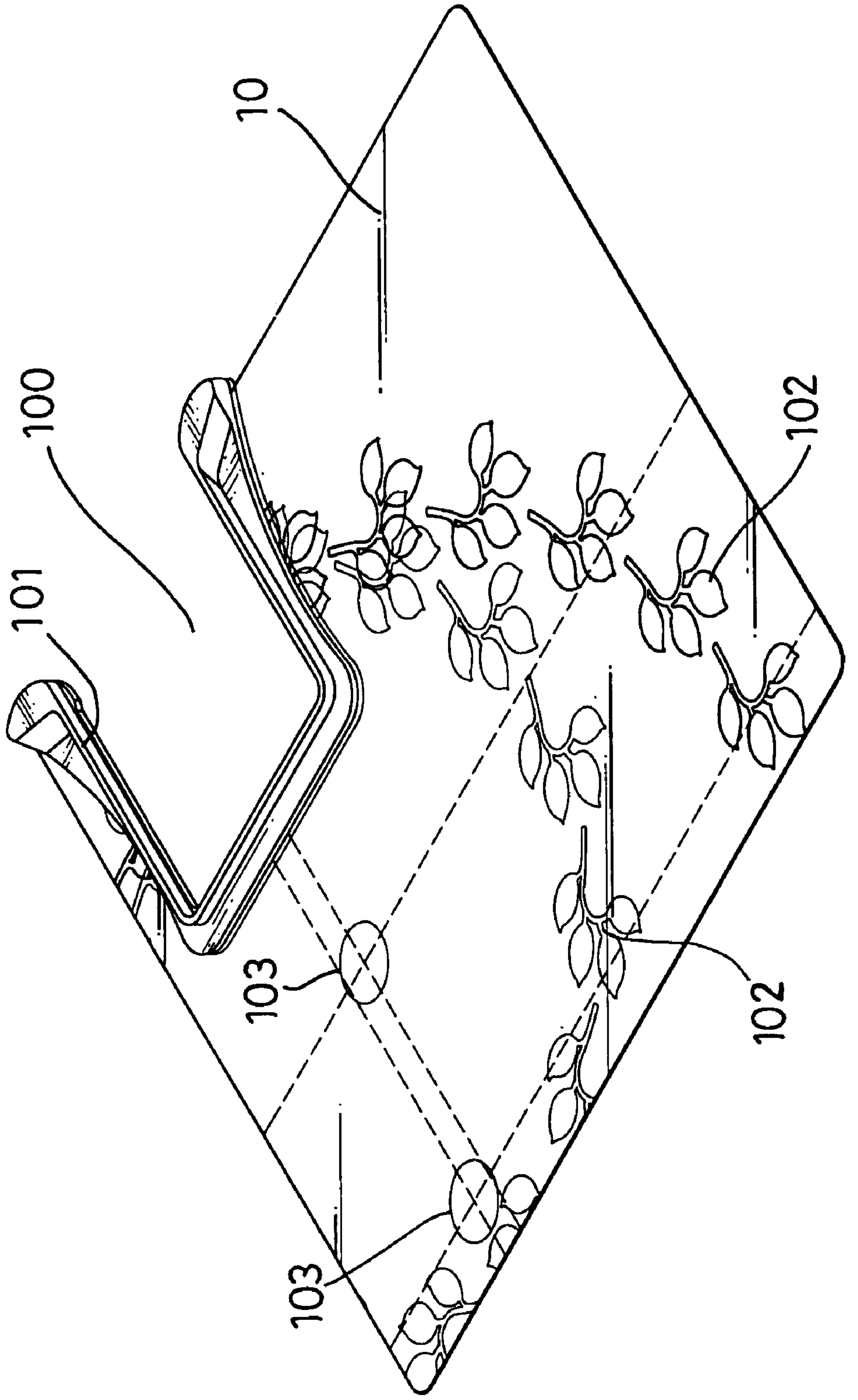
FIG. 1 is a perspective view of the template of the present invention.
Figure 2:
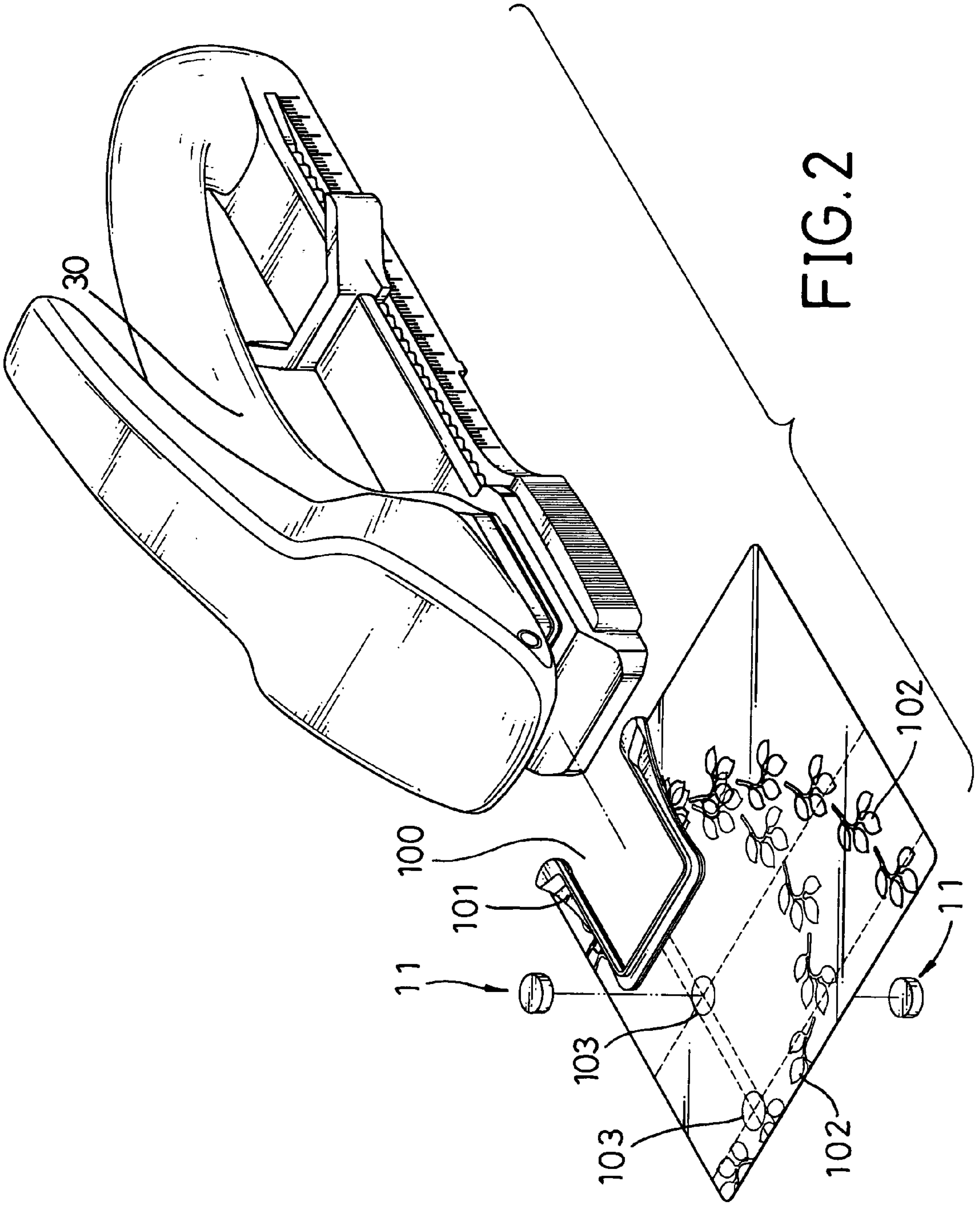
FIG. 2 is an exploded perspective view of the template with the magnets separated from the template.

With reference to FIGS. 1 and 2, it is noted that the template (10) has a mouth (100) defined in a side face of the template (10), a combining device (101) formed on a periphery defining the mouth (100), patterns (102) defined through the template (10), positioning holes (103) defined through the template (10) and a pair of magnets (11) received in one of the positioning holes (103).

Figure 3:
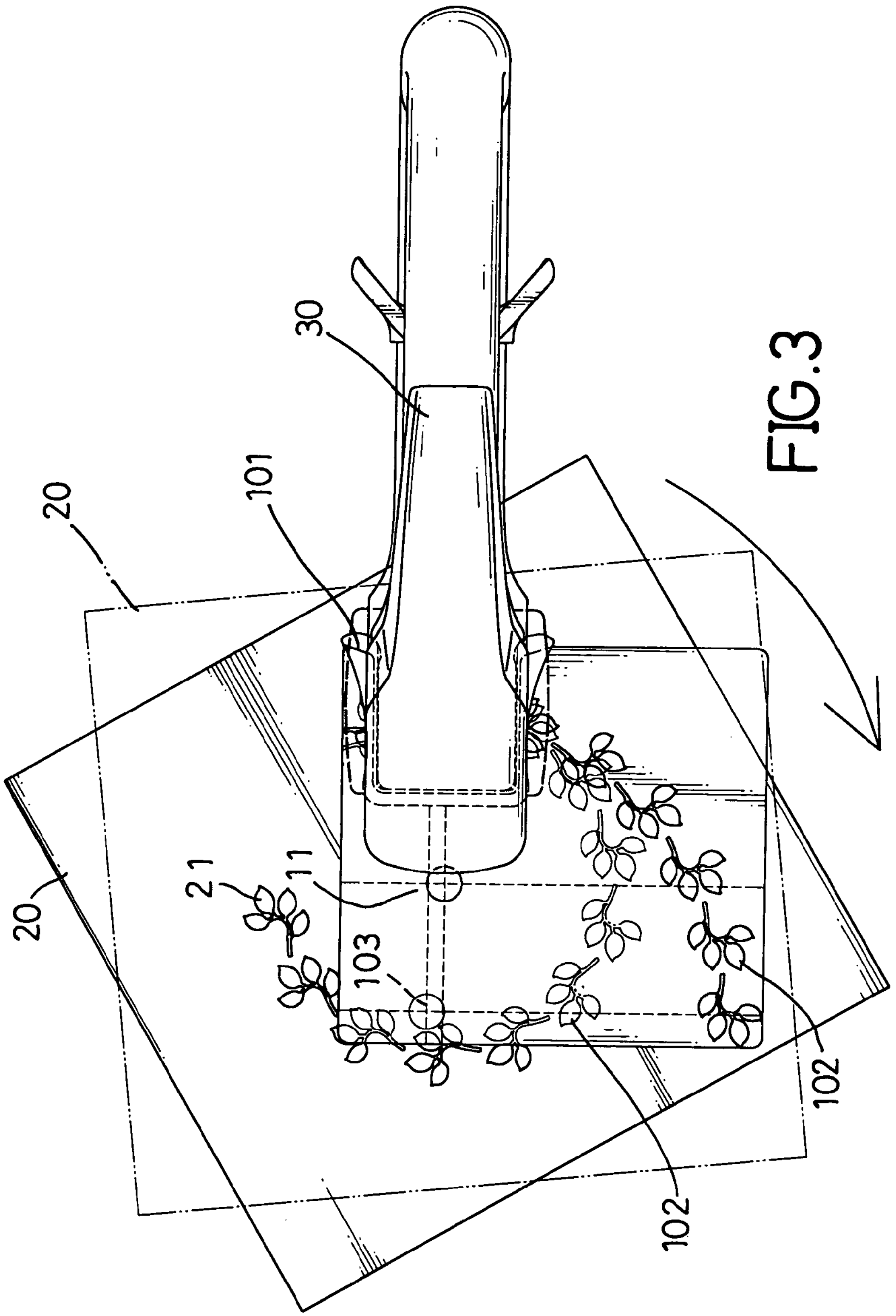
FIG. 3 is a schematic view showing the application of the template with a piece of paper placed on top of the template.

When the template (10) of the present invention is associated with an auxiliary tool (30) as shown in FIG. 3, a piece of paper (20) is placed on top of the template (10) and the auxiliary tool (30) is placed in the mouth (100) with the combining device (101), preferably a plastic bar, attached to a side face of the auxiliary tool (30). After the piece of paper (20) is placed on top of the template (10), one of the magnets (11) is first received in a corresponding one of the positioning holes (103) from a bottom face of the template (10) and then the other magnet (11) is placed on top of the piece of paper (20) to be aligned with the one magnet (11) already received in the positioning hole (103). As a result, the piece of paper (20) is positioned on top of the template (10).

Thereafter, the user is able to rotate the piece of paper (20) using the two magnets (11) as the rotation axis. In the meantime, the user is able to use the auxiliary tool (30) to make decorative holes with the patterns (102) in the template (10).

Preferably, the auxiliary tool (30) may be an eyeleting machine, a hole puncher or a pressing device.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A template for making decorative holes in a piece of paper on top of the template, the template comprising:

- a mouth defined in a side face of the template for receiving therein an auxiliary tool;
- a combining device formed on a periphery defining the mouth for combination with the auxiliary tool;
- patterns defined through a periphery of the template;
- positioning holes defined through the periphery of the template; and
- a pair of magnets received in one of the positioning holes for positioning the piece of paper on top of the template;
- whereby the piece of paper is able to be positioned on top of the template by the two magnets one of which is received in a corresponding one of the positioning holes and the other magnet is on top of the piece of paper to attract each other.

2. The template as claimed in claim 1, wherein the combining device is a plastic bar.

* * * * *